United States Patent
Schmidt et al.

(10) Patent No.: US 10,048,126 B2
(45) Date of Patent: Aug. 14, 2018

(54) OPTICAL BASE BODY FOR A SPECTROMETER, METHOD FOR PRODUCING AN OPTICAL BASE BODY FOR A SPECTROMETER AND SPECTROMETER COMPRISING SUCH OPTICAL BASE BODY

(71) Applicant: BRUKER ELEMENTAL GMBH, Kalkar (DE)

(72) Inventors: Armin Schmidt, Goch (DE); Jennifer Simons, Kranenburg (DE); Rainer Simons, Kranenburg (DE)

(73) Assignee: BRUKER AXS GMBH, Karlsruhe (DE)

( * ) Notice: Subject to any disclaimer, the term of this patent is extended or adjusted under 35 U.S.C. 154(b) by 1 day.

(21) Appl. No.: 14/916,837

(22) PCT Filed: Sep. 5, 2014

(86) PCT No.: PCT/DE2014/100324
§ 371 (c)(1),
(2) Date: Mar. 4, 2016

(87) PCT Pub. No.: WO2015/032392
PCT Pub. Date: Mar. 12, 2015

(65) Prior Publication Data
US 2016/0202120 A1    Jul. 14, 2016

(30) Foreign Application Priority Data

Sep. 5, 2013 (DE) .................. 10 2013 109 740
Sep. 10, 2013 (DE) .................. 10 2013 109 921

(51) Int. Cl.
*G01J 3/02* (2006.01)
*G02B 5/00* (2006.01)

(52) U.S. Cl.
CPC .......... *G01J 3/0202* (2013.01); *G01J 3/0235* (2013.01); *G01J 3/0256* (2013.01); *G01J 3/0286* (2013.01); *G01J 3/0291* (2013.01); *G02B 5/003* (2013.01)

(58) Field of Classification Search
CPC ...... G01J 3/0202; G01J 3/0291; G01J 3/0286; G01J 3/0256; G02B 5/003
See application file for complete search history.

(56) References Cited

U.S. PATENT DOCUMENTS

2003/0227628 A1   12/2003   Kreimer et al.
2005/0023484 A1*   2/2005   Haberstroh ........ A61B 5/14532
                                                                  250/458.1
(Continued)

FOREIGN PATENT DOCUMENTS

DE    32 11 868 A1    5/1983
DE    100 10 514 A1   9/2000
(Continued)

OTHER PUBLICATIONS

English Translation of DE 102011082468, Sep. 9, 2011.*
International Search Report, dated Apr. 29, 2015, for PCT/DE2014/100324, 3 pages.

*Primary Examiner* — Dominic J Bologna
(74) *Attorney, Agent, or Firm* — Seed IP Law Group LLP

(57) ABSTRACT

A optical base body for a spectrometer for mounting other components of a spectrometer, wherein the optical base body is produced as a sandwich construction from at least three flat elements layered on top of each other and interconnected, in particular bonded, wherein each of the flat elements has a low coefficient of thermal expansion which is substantially isotropic, at least in one isotropic plane and wherein the flat elements are layered on top of each other
(Continued)

and interconnected such that their isotropic planes run substantially parallel to one another.

16 Claims, 5 Drawing Sheets

(56) References Cited

U.S. PATENT DOCUMENTS

| | | | |
|---|---|---|---|
| 2012/0251763 A1 | 10/2012 | Yamamoto et al. | |
| 2013/0062510 A1 | 3/2013 | Fujii et al. | |
| 2013/0126073 A1* | 5/2013 | Kenney | B29C 70/46 |
| | | | 156/196 |
| 2014/0328369 A1* | 11/2014 | Flinn | G01N 33/442 |
| | | | 374/57 |
| 2015/0219848 A1* | 8/2015 | Schade | G02B 6/1221 |
| | | | 385/14 |

FOREIGN PATENT DOCUMENTS

| | | |
|---|---|---|
| DE | 10 2010 000 490 A1 | 8/2011 |
| DE | 10 2011 082 468 A1 | 3/2013 |
| WO | 01 13155 A1 | 2/2001 |

* cited by examiner

OPTICAL BASE BODY FOR A SPECTROMETER, METHOD FOR PRODUCING AN OPTICAL BASE BODY FOR A SPECTROMETER AND SPECTROMETER COMPRISING SUCH OPTICAL BASE BODY

TECHNICAL FIELD OF THE INVENTION

The invention relates to an optical base body for a spectrometer for mounting other components of a spectrometer. The invention further relates to a method for producing such an optical base body and a spectrometer comprising such an optical base body.

BACKGROUND OF THE INVENTION

In spectrometers, temperature fluctuations constitute a particular problem, because in these high-precision instruments already small thermal expansions and displacements, caused thereby, in the path of rays can lead to errors such as e.g. the so-called image position drifting and defocussings. In order to prevent such errors due to thermal influences, two basically different solution approaches are followed: On the one hand—as described e.g. in DE 10 2010 000 490 A1—compensation mechanisms are incorporated, which can compensate thermal influences. Such compensation mechanisms lead to satisfactory results, but are extremely complex. On the other hand, attempts are made to produce the optical base body, on which further components of the respective spectrometer such as e.g. light entry lenses, mirrors, diffraction gratings, detectors etc. are mounted, from materials having a low coefficient of thermal expansion, so that it is largely insensitive with respect to temperature fluctuations. In this respect, e.g. DE 32 11 868 A1 describes an optical base body of compacted ceramic, wherein the base body is formed by means of corresponding moulds.

WO 01 131 55 A1 teaches various materials, such as glass ceramic, fibre-reinforced plastic and metal alloys for the production of a spacer element for a holding device of components of optical structures.

From the publications DE 100 10 514 A1 and DE 10 2011 082 468 A1, multi-part optical base bodies and spectrometer housings are known, which are formed either by shaping such as e.g. deep-drawing or respectively by the assembling of individual parts in particular of carbon-fibre-reinforced plastic.

The known optical base bodies, which are also designated as component carriers, chassis, optical bank, housing etc., fulfil their purposes but always constitute compromises between characteristics such as accuracy, manufacturing effort, manufacturing costs, liability to fracture, weight, variability etc., so that a need for improvement exists in several respects.

DISCLOSURE OF THE INVENTION

The invention is based on the problem of indicating an optical base body which is improved with regard to its temperature stability, i.e. its insensitivity with respect to temperature fluctuations at least within a usual temperature range in the operation of a spectrometer, and a method for its production.

The problem is solved by an optical base body having the features of Claim 1 or respectively by a method having the features of Claim 12. The independent Claim 19 relates to a spectrometer with an optical base body according to the invention. The subclaims relate to advantageous configurations and further developments of the invention.

The invention is based on the basic idea of producing the optical base body as a sandwich construction from several flat elements layered on top of each other and interconnected, in particular bonded, each of said flat elements having a low coefficient of thermal expansion which is substantially isotropic, at least in one isotropic plane, wherein the flat elements are layered on top of each other and interconnected such that their isotropic planes run substantially parallel to one another. Thereby, in a surprising manner, a whole series of advantages is achieved.

It is to be stressed at this point that the term "layered on top of each other" was selected representatively, because in the conventional mounting techniques the individual elements are arranged successively and on one another, but the elements of course can also be layered adjacent to one another, which is to be expressly included by the scope of protection. In addition, compact spectrometers can in any case be held in different positions, so that the elements, depending on the viewing angle of the observer, lie in a view over one another, in another view adjacent to one another.

Hitherto, attempts were made in optical base bodies to avoid bondings and multi-part types of construction, because settlements or respectively (in the case of thermal fluctuations) induced stresses can occur here. Many of the known optical base bodies are therefore processed from the solid, which is regularly very laborious and entails a high degree of tool wear. In addition, therefore, only restrictedly complex structures can be created. According to the invention, individual flat elements are now produced from plates of a material with a low coefficient of thermal expansion which is isotropic at least in one isotropic plane, wherein individual plates are not only simpler to process than a solid body, from which the optical base body must be processed, but wherein individual plates can also be processed easily, so that adjacent plates complement one another for the formation of complex paths of rays and/or mountings for further components of a spectrometer.

Through the sandwich construction according to the invention, it also becomes possible for the first time to create an optical base body with complex path of rays- and mounting structures suitable for equipping with individual channel detectors, in which mounts for individual channel detectors are provided so that the individual channel detectors can be introduced from different sides into the optical base body. Thereby, it becomes possible to arrange the light receiving sections at least of particular individual channel detectors substantially closer to one another than would be possible in the case of detectors introduced parallel to one another from the same side. Such detectors namely usually have a thicker main body and a thinner light receiving section at one end of the main body, so that in the case of detectors arranged parallel adjacent to one other the thickness of the respective main bodies defines a minimum distance of the light receiving sections of the detectors. Through the arrangement according to the invention, spectral lines lying very close to one another can now also be detected by means of individual channel detectors.

Advantageously, the flat elements can be produced from one or several plates by means of a separation method, e.g. by sawing, milling, waterjet- or laser cutting, so that isotropic planes present in the plates, within which the coefficient of thermal expansion is at least approximately isotropic, remains, whereas shaping methods, such as e.g. deep-drawing, regularly alters isotropy characteristics.

A material having a low coefficient of thermal expansion is understood to mean here materials having a coefficient of thermal expansion less than $5\times10^{-6}\,K^{-1}$, preferably less than $3\times10^{-6}\,K^{-1}$, such as in particular carbon-fibre-reinforced plastics (CFP), glass-fibre-reinforced plastics (GFP), glasses, in particular quartz glasses and ceramics, in particular glass ceramics.

Different flat elements of an optical base body can consist of different materials, but it is currently preferred that all flat elements of an optical base body consist of a single material. When the concern with this material is with a material having particular marked directions, such as e.g. CFP, the flat elements are preferably layered on top of each other and interconnected such that these directions coincide with one another, that therefore in elements consisting of CFP the fibre courses of adjacent elements coincide with one another. Plates of GFP or CFP namely mostly have anisotropies, in particular in the direction of the plate thickness axis. According to the invention, through alignment of the flat elements, all planes of symmetry remain in alignment, whilst any anisotropies have an effect only in the thickness direction of the optical base body, which is without influence on the optical characteristics of the optical base body. In other words, for the structure of a simple hollow base body, such as e.g. a cuboid with a base, a top and four side walls, not for instance all parts are cut out from one plate and then the side walls are arranged, i.e. tilted through 90° with respect to the base and top, but rather according to the invention side walls e.g. in smaller spectrometers are created in that from a single correspondingly thick plate or from several thin plates so much material is removed that only a frame remains standing, which forms the side walls or at least part of a side wall. In larger spectrometers, side walls are constructed accordingly by the layering over one another of frame parts formed in the described manner.

Further details and advantages of the invention will emerge from the following purely exemplary and non-restrictive description of example embodiments of the invention in connection with the drawings.

DESCRIPTION OF PREFERRED EMBODIMENTS

Figure 1:
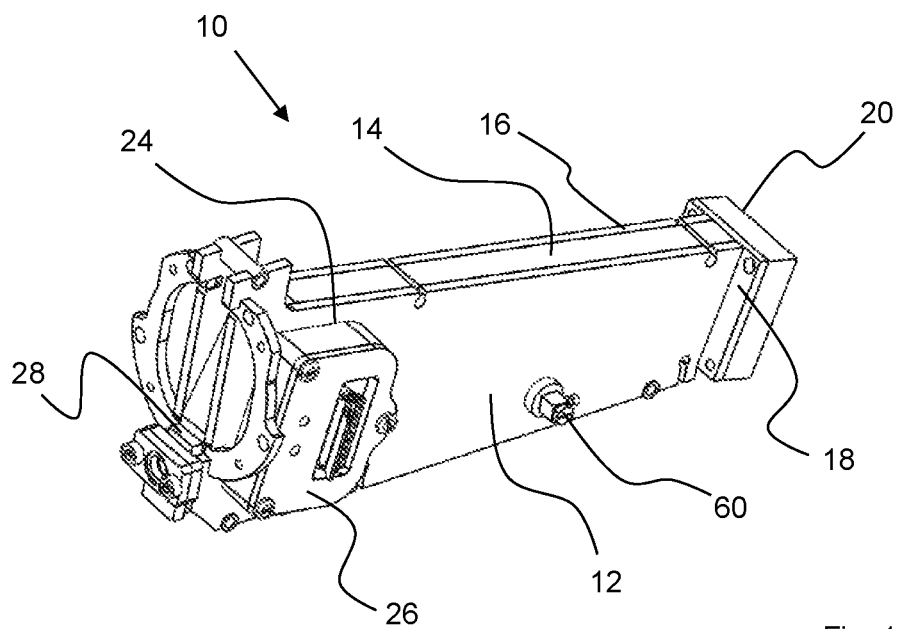
FIG. 1 shows the essential parts of a compact spectrometer for mobile applications with an optical base body according to the invention, in perspective illustration.
Figure 2A:
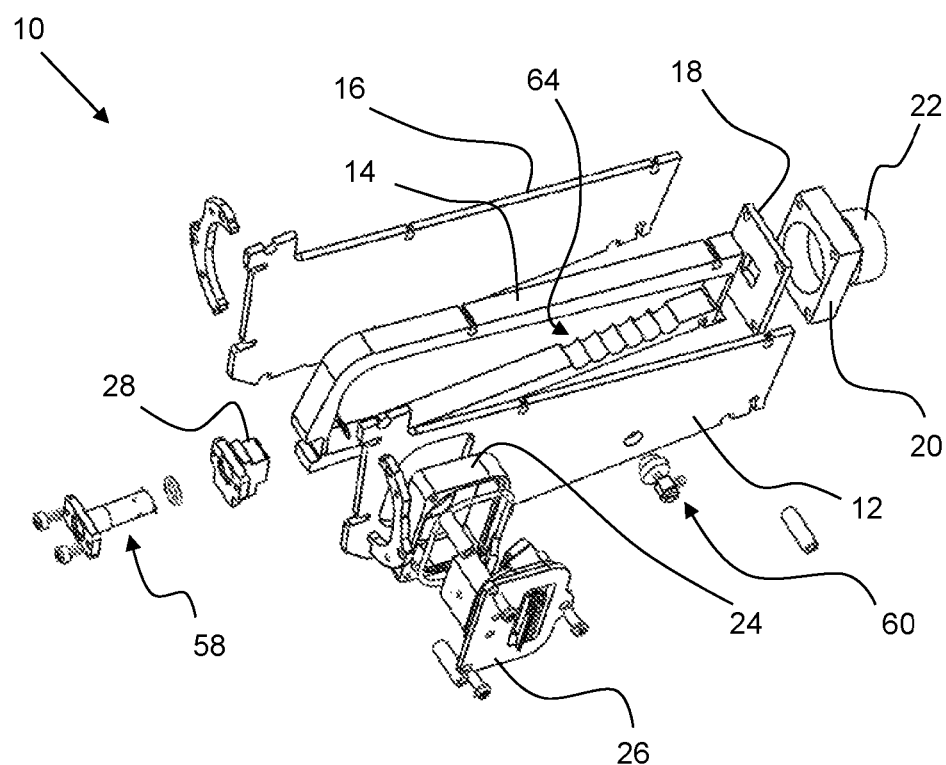
FIG. 2A shows the spectrometer according to FIG. 1 in perspective exploded illustration.

FIGS. 1 and 2A show a spectrometer, designated in its entirety by 10, with its basic components. The spectrometer comprises a optical base body which consists, in a sandwich construction, of flat elements layered on top of each other and bonded with one another, namely in this example embodiment the three flat elements 12, 14 and 16. Various assemblies are fastened on the optical base body, in particular a mounting 18 for fastening a grating carrier 20 for a diffraction grating 22, a mounting 24 for a detector carrier 26 with a detector, embodied here as a semiconductor detector, and a lens carrier 28 for fastening a light entry lens 58, which has an entrance slit for light which is to be analysed in the spectrometer. In the flat element 12, as can be readily seen in FIG. 2B, an orifice 62 is provided, in which a connection piece 60 is mounted, via which the spectrometer can be flushed, e.g. with argon, during operation.

The spectrometer 10 which is shown here is configured as a compact, mobile spectrometer. The individual flat elements 12, 14 and 16 of the optical base body are, in this example embodiment, cut out from CFP plates, in particular by means of waterjet cutting. Here, the two outer elements 12 and 16 are cut out from a single plate or respectively— depending on the size of the plates which are used—from two separate plates with a thickness of 3 mm, whilst the central element 14, enclosed in a sandwich-like manner between the two outer elements 12 and 16, is cut out from a plate with a thickness of 10 mm. The indications of size concern typical dimensions. Generally, the flat elements used according to the invention have thicknesses in the range of approximately 1 mm to approximately 15 mm. The flat elements are produced by pure separation methods, such as in particular waterjet cutting, from corresponding plates, without shaping the plates, therefore e.g. bending or deep-drawing, because through these separation methods the isotropy characteristics of the plates are not altered.

When the plates have particular marked directions, such as e.g. CFP and GFP plates through the respective fibre layers of the fibres provided in them, the flat elements or respectively the plates, on cutting of the flat elements, are aligned so that the preferred directions in the individual flat elements are aligned with one another in the finished optical base body.

Plates used according to the invention have at least one isotropic plane, within which the coefficient of thermal expansion is substantially isotropic. The isotropic plane runs in normal cases parallel to the flat outer sides of the plates. Anisotropies in thickness direction then do not impair the optical characteristics of the finished optical base body.

In the example embodiment which is shown, the optical base body forms, at the same time, the spectrometer housing. Further housings for compartmentalizing the spectrometer can be dispensed with, because it is easily possible to configure the flat elements so that they fulfil the desired dual function of lens carrier and container. In the construction of the optical base body, a highly accurate processing of the individual plates or the production of fits or position stops is not necessary, because e.g. mounting templates, in particular bonding templates, can be used, in order to align the individual flat elements with respect to one another. In the particularly preferred embodiment shown here, even bonding templates can be dispensed with, because the flat elements are aligned via positioning axes, as described below.

Figure 2B:
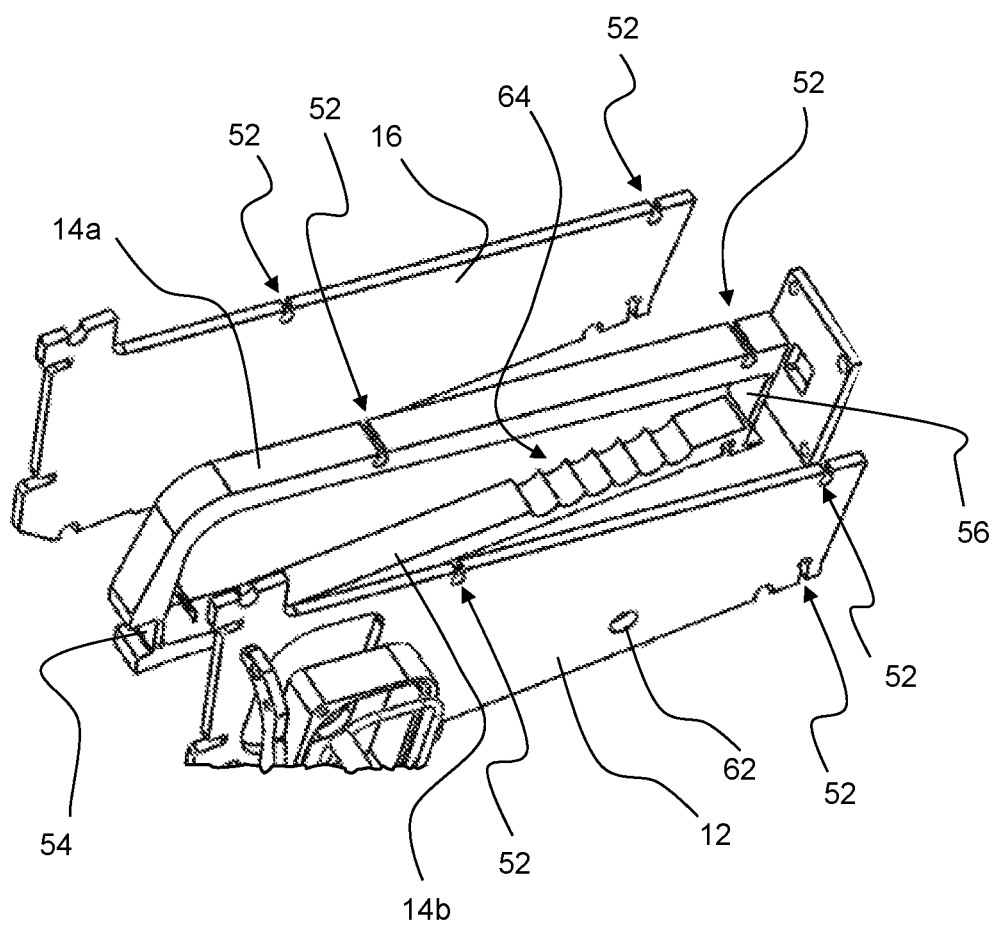
FIG. 2B shows an enlargement of a cutout of FIG. 2A.

FIGS. 2A and 2B show the state of essential components of the spectrometer before the final assembly. In particular, the flat element 14, produced in a single piece, is actually still a single component in the state shown, which single component is also designated the central plate, and which then together with the two flat elements 12 and 16, which are also designated as side plates, can define a cavity. For the construction of the optical base body, advantageously one proceeds so that the central element 14, after the cutting out of a corresponding material plate, firstly forms a one-part circumferential frame, which is aligned and bonded with one of the two lateral elements, e.g. the element 12. Only after the bonding, openings are formed in the element 14 for the light entry lens and a passage for rays to/from the grating 22, in particular by cutting out. The openings can also extend over the entire thickness of the element 14, so that the latter is separated into two parts 14a and 14b (see FIG. 2B), which, however, are both fastened on the element 12 and therefore remain in the desired alignment to one another.

In the currently preferred embodiment, the webs 54 and 56 shown in FIG. 2B are completely removed after the bonding of the central plate with one of the side plates. The webs 54 and 56 advantageously ensure that the parts 14a and 14b of the central plate always remain oriented correctly to one another and no bonding template is required during the assembly of the optical base body, as would be necessary if the parts 14a and 14b were detached from one another, or even manufactured directly separately, before the bonding with one of the side plates. In particular, in this way also the plate-inherent isotropy of the thermal expansion is maintained in the parts 14a and 14b resulting after the removal of the webs 54 and 56.

Dispensing with a bonding template, the alignment openings 52 in the flat elements 12, 14 and 16 serve for the mounting of the optical base body, wherein only some of these openings were provided with reference numbers in FIG. 2B, for reasons of clarity. During mounting, corresponding, usually rod-shaped alignment elements, at least partially complementary to the alignment openings, also designated positioning axes, can be guided through these alignment openings, in order to align the components of the optical base body with one another. When the central and lateral parts of the optical base body are then bonded to one another, the system can be advantageously aligned in that firstly the orientation of the diffraction grating grooves is adjusted rotationally and subsequently the detector assembly is moved and bonded. This procedure permits an exact fine adjustment of the spectrometer lens, to achieve the desired spectral resolution.

Depending on the configuration of the spectrometer, further elements, such as e.g. apertures, can be fastened, and in particular bonded, on and in the lateral elements 12 and 16, so that in the finished installed state these then project into the cavity defined by the lateral elements and the central element. For this, the elements 12 and 16 can be provided with corresponding openings.

A particular advantage of the sandwich construction is that the central element 14, on cutting out from a plate, can be provided directly with particular shapes, facing the interior of the spectrometer in the intended installed state, which shapes form light-conducting structures and scattered light traps. Thus, e.g. the toothed structure 64 of the flat element 14, shown in FIGS. 2A and 2B, forms a scattered light trap for the zeroth diffraction order.

Figure 3:
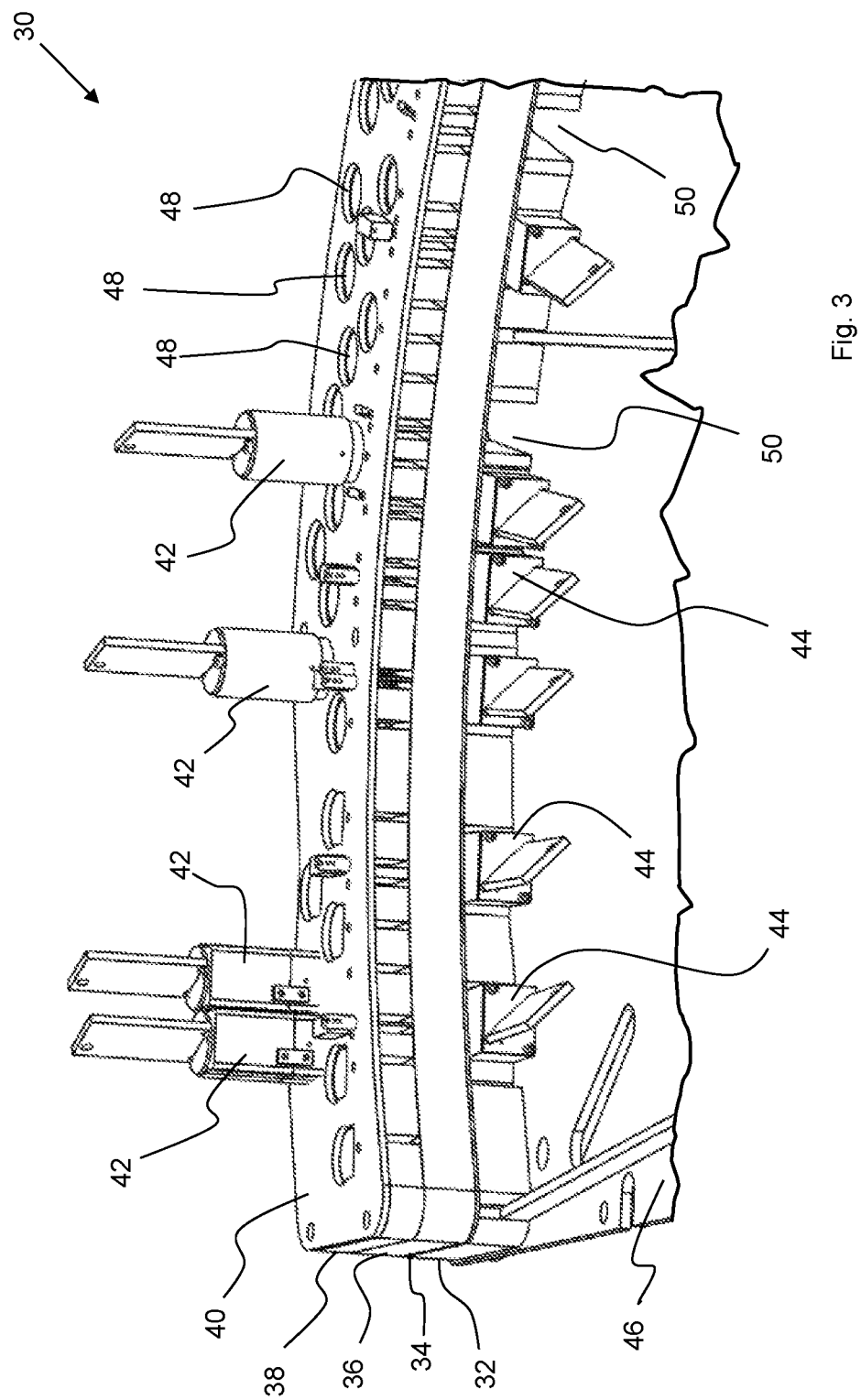
FIG. 3 shows a portion of a spectrometer with individual channel detectors and with an optical base body according to the invention, in perspective illustration.
Figure 4:
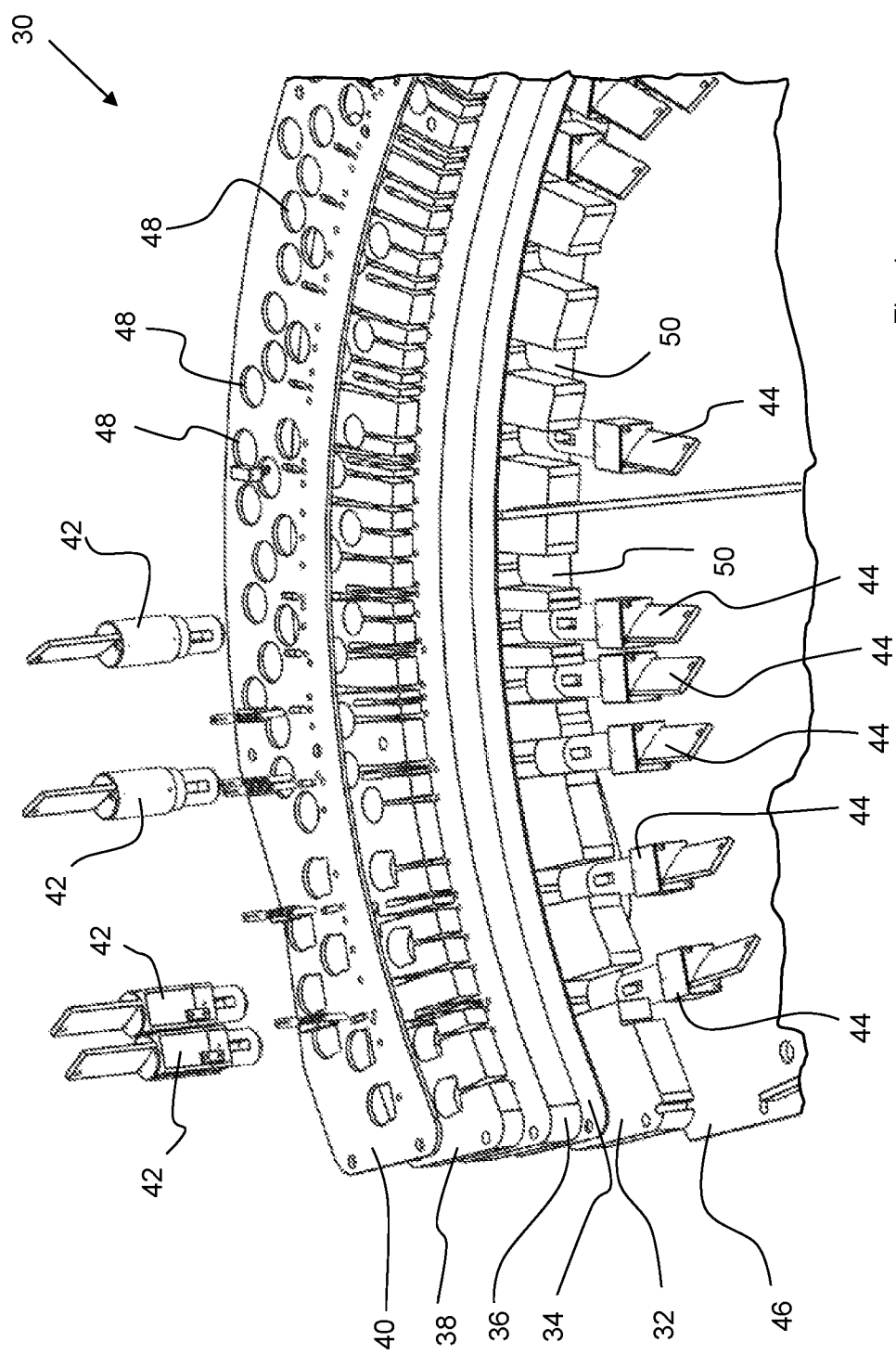
FIG. 4 shows a portion of a spectrometer according to FIG. 3 in perspective exploded illustration, viewed in the direction of the beam entries to the individual channel detectors.
Figure 5:
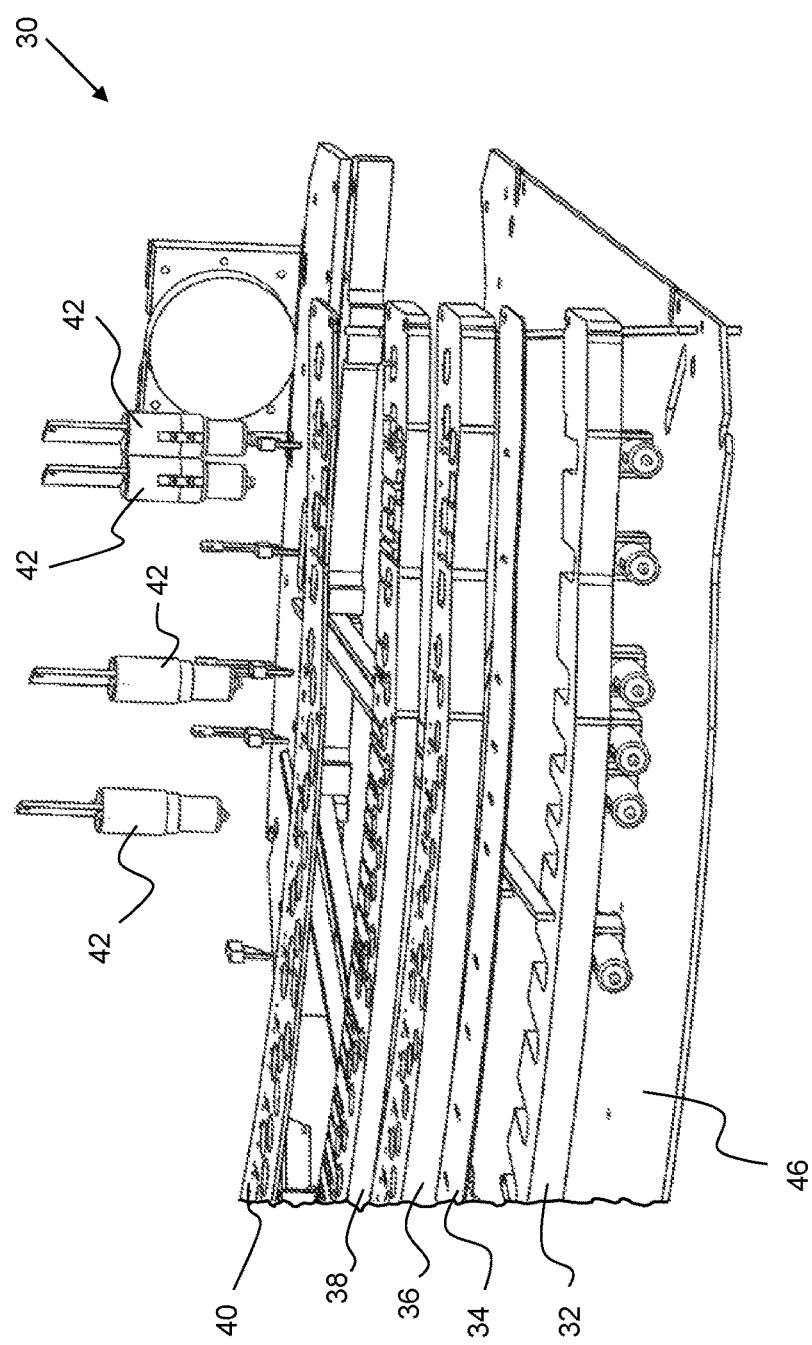
FIG. 5 shows a portion of a spectrometer according to FIG. 3 in perspective exploded illustration, viewed onto the rear side of the optical base body, facing away from the beam entries.

In FIGS. 3 to 5 respectively a section of a spectrometer, designated in its entirety by 30, is shown, in which this concerns a spectrometer with individual channel detectors for stationary application and in which in an optical base body, which is constructed according to the invention by layering and connecting of several flat elements 32, 34, 36, 48 and 40 on top of each other, mounts are formed for individual channel detectors 42 and 44, only some of which are shown here. Spectrometers with individual channel detectors are distinguished by an even higher precision, compared with spectrometers with line detectors.

Individual channel detectors usually have a tube-shaped form with a thicker main body and a thinner light receiving section at one end of the main body, so that in the case of detectors arranged parallel adjacent to one another, the thickness of the respective main bodies defines a minimum distance of the light receiving sections of the detectors. Through the arrangement of the detectors according to the invention, described below, also spectral lines lying very close to one another can be detected by means of individual channel detectors, because here the distance of the light receiving sections of adjacent detectors is not limited by the thickness of their main bodies.

The optical base body is fastened on a base plate 46, which in this example embodiment consists of the same material as the flat elements 32 to 40 and which likewise has an isotropic plane within which the coefficient of thermal expansion is substantially isotropic, wherein the isotropic planes of the flat elements 32 to 40 and of the base plate 46 are aligned parallel to one another.

The flat elements 32 to 40 and the base plate 46 are produced by separation methods without shaping from correspondingly dimensioned plates, so that corresponding isotropy characteristics of the plates are not disturbed by shaping. It is stressed here at this point that it is, of course, possible to provide particular shaped regions at the flat elements, and namely also at the flat elements shown in FIGS. 1, 2A and 2B, e.g. marginal regions which have no function with regard to the optical characteristics of the spectrometer and accordingly do not form part of the actual optical base body. The term "flat elements" therefore is understood to mean only those sections of the optical base body which determine the optical characteristics of the spectrometer and the isotropic planes of which are substantially parallel to one another.

Typically, the flat elements 32 and 36 have a thickness in the range of approximately 9 to 15 mm, preferably approximately 12 mm, the flat elements 34 and 40 have a thickness of approximately 1 to 5 mm, preferably approximately 3 mm and the flat element 38 and the base plate 46 have a thickness in the range of approximately 6 to 10 mm, preferably approximately 8 mm. The indications of size concern typical dimensions. Generally the flat elements used according to the invention have thicknesses in the range of approximately 1 mm to approximately 15 mm.

In the individual flat elements 32 to 40 of the optical base body, different openings are provided, which complement one another partially for the formation of paths of rays and mounts for further structural elements of the spectrometer, in particular for mirrors and individual channel detectors. For example, in the flat element 40, openings 48 are provided and in the flat element 32, openings 50 are provided, respectively only some of which have been given reference numbers, for the introduction of detectors 42, 44. Corresponding openings and additional light entry channels are situated in the respectively adjacent flat elements. From this illustration, it is evident for the specialist that the invention advantageously also allows complex paths of rays and mounts to be formed in a simple manner in that corresponding sections of the paths of rays or respectively of the mounts are formed in individual flat elements, which then complement one another with openings in adjacent flat elements to the desired complex structure, in particular to an optical base body suitable for equipping with individual channel sensors, in which mounts are provided for individual channel detectors, which can be inserted from different sides, from above and from the side in the example which is shown, into the optical base body, so that the light receiving sections at least of particular individual channel detectors can be arranged substantially closer to one another than would be possible in the case of detectors introduced parallel to one another from the same side. This also leads to the spectrometer being able to be constructed more compactly, because adjacent spectral lines now have to be fanned out less widely in order to arrive at the light receiving sections of the detectors intended for the detection of the respective spectral lines.

Through the configuration of the respective paths of rays, in particular through arrangement of mirrors, light can be directed in a simple manner so that it falls onto the light receiving sections of the respective detectors.

In the preferred embodiment shown in FIGS. 3 to 5, the optical base body is provided with a plurality of openings 48, 50 for individual channel detectors, usually only some of which are then equipped with detectors in the subsequent operation of the spectrometer. The optical base body which is shown concerns a "universal main part", in which mounts for detectors are provided at those sites at which substances typically analysed by customers show spectral lines. In the respective case of application, typically only a few, e.g. 5 or 10 spectral lines, are of interest to the customer, but the optical base body could receive e.g. 30 or 50 individual channel detectors for the detection of individual spectral lines. The customer can then advantageously indicate which particular spectral lines are of interest for his case of application and are to be detected, if applicable, with the spectrometer, so that the optical base body only has to be equipped accordingly with individual channel detectors, which has several advantages. Thus, the spectrometer does not have to have more detectors than are necessary in the respective case of application. The manufacturer no longer has to manufacture optical base body's specific to the customer or respectively case of application, as usual hitherto, but can rather cover various wishes with a universal main part. When the wishes change on the part of the customer, a spectrometer purchased by the customer does not have to be replaced, but rather merely the detector configuration has to be altered, i.e. particular detectors must be inserted into different mounts.

In the embodiment shown in FIGS. 3 to 5, the mounts are constructed such that the detectors can be inserted into the optical base body from two sides offset by 90° to one another. However, provision can also be made that the detectors are inserted from more than two sides, wherein these sides do not have to be offset by 90° to one another.

In the embodiment which is shown, the individual channel detectors which are used are of the same type of construction, wherein in the optical base body paths of rays and/or mirrors are arranged so that light rays can fall onto the light receiving sections of the detectors irrespective of the side from which the detectors are inserted into the optical base body. Therefore, advantageously a single detector type can be used, i.e. e.g. a type in which light is irradiated transversely to the longitudinal direction of the detector, which has cost advantages in the purchasing (larger numbers of units of one type instead of smaller numbers of units of different types) and repair (different types of individual channel detectors do not have to be held available).

LIST OF REFERENCE NUMBERS 10 spectrometer
12 flat element
14 flat element
16 flat element
18 mounting
20 grating carrier
22 diffraction grating
24 mounting
26 detector carrier
28 lens carrier
30 spectrometer
32 flat element
34 flat element
36 flat element
38 flat element
40 flat element
42 detector
44 detector
46 base plate
48 opening
50 opening
52 alignment opening
54 web
56 web
58 light entry lens
60 connection piece
62 orifice
64 scattered light trap

The invention claimed is:

1. An optical base body for a spectrometer that allows mounting other components of the spectrometer, the optical base body comprising:
   at least three flat elements, the at least three flat elements layered on top of each other in a sandwich construction and interconnected, wherein in at least one of the flat elements has an opening that provides a cavity that extends between at least two of the other ones of the at least three flat elements,
   wherein the flat elements comprise carbon-fibre-reinforced plastic (CFP) plates or glass-fibre-reinforced plastic (GFP) plates of a single type, and
   wherein the flat elements have respective fibre courses, the flat elements aligned in the optical base body so that the fibre courses of the flat elements coincide with one another.

2. The optical base body according to claim 1, characterized in that the flat elements have isotropic planes that are substantially parallel with one another.

3. The optical base body according to claim 1, characterized in that the opening comprises a number of scattered light traps that conduct light.

4. The optical base body according to claim 1, characterized in that in several of the at least three flat elements have respective openings, and the openings in adjacent ones of the at least three flat elements complement each other to form paths of rays and/or of mounts for further structural elements of the spectrometer.

5. The optical base body according to claim 1, characterized in that the flat elements in the finished installed state form a spectrometer housing.

6. The optical base body according to claim 1, characterized in that the flat elements respectively have a thickness in the range of approximately 1 mm to approximately 15 mm.

7. The optical base body according to claim 1, characterized in that the optical base body comprises a number of mounts, wherein the mounts are constructed so that individual channel detectors can be inserted from different sides into the optical base body.

8. The optical base body according to claim 1, characterized in that in the optical base body paths of rays and/or mounts for mounting said other components are formed by openings formed in said flat elements by means of separation methods.

9. A spectrometer comprising an optical base body according to claim 1, the optical base body comprising a number of mounts, and further comprising a number of components, each of the components mounted via respective ones of the mounts of the optical base body.

10. The spectrometer according to claim 9, wherein, the components include a number of channel detectors, and the mounts of the optical base body are constructed so that individual ones of the channel detectors can be inserted from different sides into the optical base body.

11. The spectrometer according to claim 10 with individual channel detectors, wherein each individual channel detector has a light receiving section, characterized in that at least particular adjacent mounts are constructed in the optical base body so that the light receiving sections of adjacent detectors inserted into them lie closer to one another in an intended installed state than would be possible with an arrangement of the same detectors adjacent to one another in a parallel manner.

12. The spectrometer according to claim 10, characterized in that the mounts are constructed so that the detectors can be inserted into the optical base body from two to four sides, offset to one another respectively by 90°.

13. The spectrometer according to claim 10, characterized in that the mounts are formed for equipping with individual channel detectors and paths of rays through openings formed in flat elements, layered on top of each other, by means of separation methods.

14. A method for producing an optical base body for a spectrometer that allows mounting other components of the spectrometer, the method comprising:

providing one plate or several plates of a single type, said one plate or said several plates being made of one of CFP (carbon-fibre-reinforced plastic) or GFP (glass-fibre-reinforced plastic);

producing flat elements from the one plate or several plates of a single type by a separation method to maintain an isotropic plane of the one plate or several plates of the single type in the flat elements, wherein an opening is introduced into at least one of the flat elements by the separation method, which opening is covered by two other ones of the flat elements for the formation of a cavity between the flat elements, wherein the flat elements have fibre courses, and building up the optical base body by layering on top of each other and connecting the flat elements with one another such that the fibre courses of the flat elements coincide with one another.

15. The method according to claim 14, characterized in that openings are introduced into several flat elements by means of a separation method, such that on the layering on top of each other and connecting of the flat elements at least particular openings in adjacent flat elements complement each other for the formation of paths of rays and/or for mounting other components of spectrometers.

16. The method according to claim 14, characterized in that alignment openings, corresponding to one another, are introduced into flat elements which are to be layered on top of each other in an adjacent manner, before the connecting of the flat elements with one another, such that the flat elements can be aligned to one another by the introducing of alignment elements which are at least partially complementary to the alignment openings.

* * * * *